Feb. 6, 1951     C. B. WATTS, JR     2,540,150
PARALLEL LANE COMPUTER
Filed Oct. 27, 1948
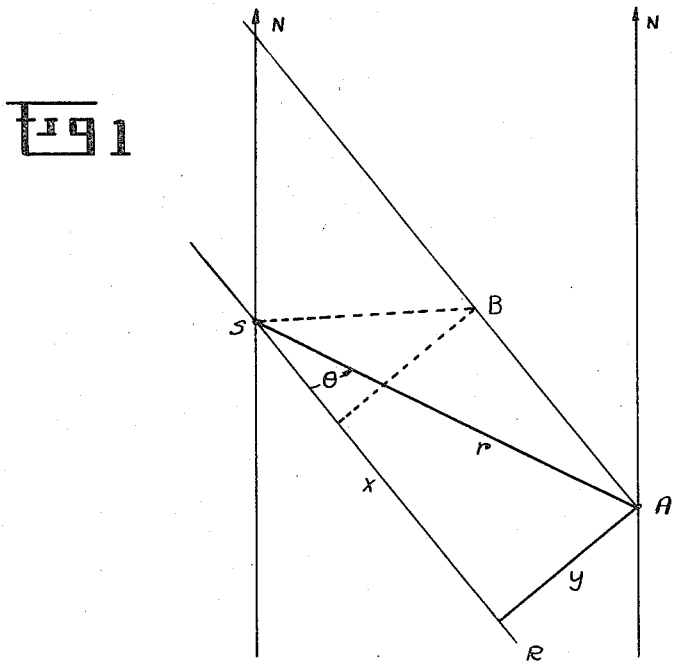
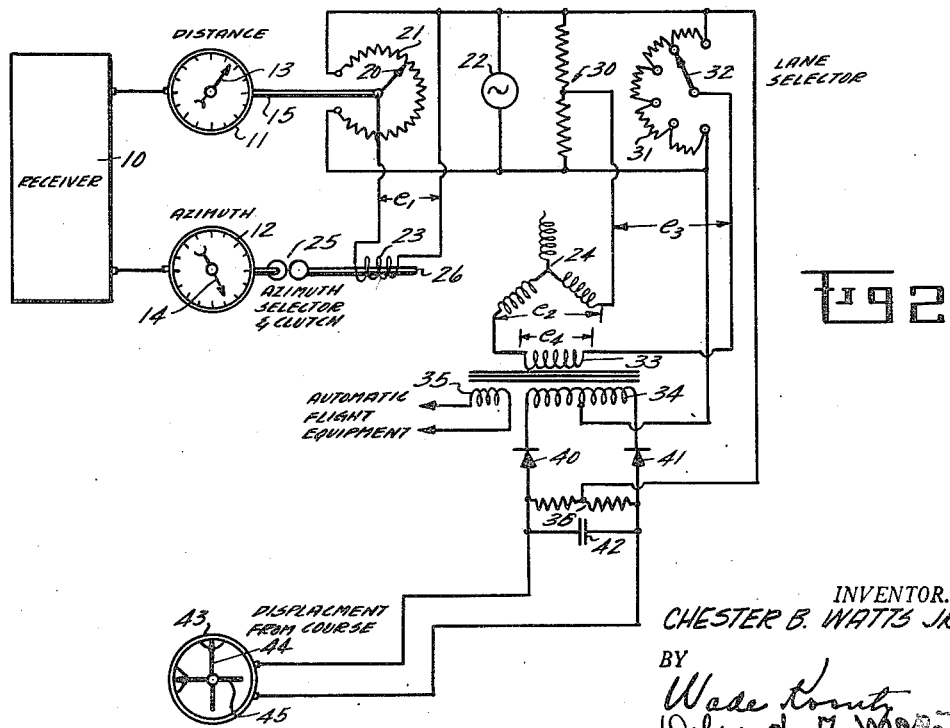
INVENTOR.
CHESTER B. WATTS JR.

Patented Feb. 6, 1951

2,540,150

UNITED STATES PATENT OFFICE 2,540,150

PARALLEL LANE COMPUTER

Chester B. Watts, Jr., Indianapolis, Ind.

Application October 27, 1948, Serial No. 56,881

6 Claims. (Cl. 235—61)

(Granted under the act of March 3, 1883, as amended April 30, 1928; 370 O. G. 757)

The invention described herein may be manufactured and used by or for the Government for governmental purposes without payment to me of any royalty thereon.

This invention relates to electrical computers for use in conjunction with omnidirectional azimuth and distance measuring radio equipment for maintaining the flight course of an aircraft parallel to a selected radial to an omnidirectional beacon broadcasting station.

In aviation practices, various means have been devised for holding an aircraft upon a particular flight course, as well as for indicating to aeroplane pilots the geographical positions of their aircraft during flight. At a modern omnidirectional beacon the transmission is very high frequency continuous wave, with 30 cycle reference modulation and 30 cycle variable modulation. When these two modulations are exactly in phase the aeroplane heading is due north. The phase difference between the two modulations is measured to determine the aeroplane heading in azimuth with ± 2 degrees accuracy. Distance measuring equipment is mounted at each omnidirectional beacon and transmits at 1000 megacycles.

With the described equipment transmitting at the omnidirectional beacon station, it is a relatively simple matter for the navigator of the aeroplane to fly any radial to the station, or to fly any circle centered upon the station. With modern receiver equipment the navigator in the aeroplane can read directly the aeroplane's distance from the beacon and can determine his flight path angle with respect to the beacon. With the information so obtained vector diagrams of the aeroplane's flight course can be solved and a particular flight course flown from which the geographical location of the aircraft can be determined with a considerable degree of precision.

The present invention is directed toward the solution of the problem of using data from a modern omnidirectional beacon for flying a course along two points not situated upon the same radial to the beacon or along a circle centered upon the beacon. The present invention comprises a computer that takes the information available from the omnidirectional beacon and applies it to a right-left indicator instrument designating any departure from an arbitrarily elected flight course toward a desired destination and not passing through the beacon nor along a circle centered upon the beacon.

The objects of the present invention include the provision of simplified and reliable improved flight course indicating and maintaining equipment using omnidirectional range and distance measuring equipment information in maintaining a flight course parallel to a radial to an omnidirectional broadcasting beacon station of known location, even though the flight course is not along a radial to the station or along a circle centered on the station, but is along a course between two points that are not situated upon the same radial to the station. The equipment contemplated hereby provides inherently high stability of the course determined, avoids the use of vacuum tubes and provides course determinations that conform in accuracy with the azimuth and distance data obtained from the station used as a reference and within the range of which the determinations are made. The presentation appears upon a cross pointer or right-left indicator that shows any displacement from the particular flight path for which the instrument is set, or the equipment output may operate an automatic pilot if preferred.

With the above and other objects in view that will be apparent from the following description, an operative illustrative embodiment of the present invention is shown in the accompanying drawing wherein:

Fig. 1 is a space diagram of an aircraft following a flight course that is neither along a radial to nor along a circle centered upon an omnidirectional beacon references station; and Fig. 2 is a fragmentary circuit diagram of an illustrative embodiment of the present invention.

In Fig. 1 of the accompanying drawing, an aeroplane at an arbitrary position A and following a flight course AB toward its destination, intercepts radio signal from an omnidirectional beacon at a known geographical point S. Modern receiver equipment in the aeroplane, indicated in Fig. 2 of the drawing as receiver 10, adapted for the interpretation of omnidirectional beacon signals by means of a direct reading distance meter and an azimuth meter, provides the distance AS or $r$ and the azimuth reading. With the azimuth readings of the flight path AB and of the direction of the signal source AS, the angle BAS or its equal angle ASR, or theta is known. The arrows AN and SN, passing through the positions A of the aircraft and S of the beacon station, respectively indicate true north. With respect to the beacon station at S, the position of the aeroplane at A is then accurately established by coordinates $r$ and theta, of distance and azimuth, respectively, or by $x$ and $y$ as preferred, which are variables as the aeroplane continues to fly along its course AB.

The above information is then used by the navigator who draws on his map the line AB from the site of the aeroplane A toward its destination, the line AS from the aeroplane to the beacon, and the line SR through the station S and parallel to the line AB. The navigator also drops a perpendicular $y$ from the point A to the line SR. The lines AS and RS are both radials to the station S and the line $y$ is the shortest distance from the flight course AB to the beacon at point S.

In order for the aeroplane to continue to pursue its flight course along the line AB without deviation therefrom it is necessary that the value of $y$ be held constant as the values of the polar coordinates $r$ and $\theta$ vary during flight. The navigator therefore determines the value of $y$ on the basis of the determined values of the distance $r$ and of the angle $\theta$ from the relationship:

$$\sin \theta = \frac{y}{r}$$

or $y = r \sin \theta$. The position of the aeroplane along its flight course AB is then held constant by obtaining and then maintaining constant a voltage that is proportional to the value of the distance $y$, preferably by the use of the equipment shown in Fig. 2 of the accompanying drawing. This result is accomplished by setting an azimuth selector and clutch 25 and a lane selector contact arm 32 after which a cross-pointer instrument 43 indicates any departure from the prescribed course along the line AB.

In Fig. 2 of the accompanying drawing distance and azimuth outputs from known modified equipment in the receiver 10 are conducted to distance and azimuth instruments 11 and 12 for actuating indicating needles 13 and 14, respectively, thereof.

Subsequent displacements of the distance indicating needle 13, under the control of the distance output from the receiver 10 through a mechanical coupling 15, cause corresponding displacements of a distance potentiometer contact arm 20 along a distance potentiometer resistance winding 21 that is connected across an alternating current source 22. Displacement of the distance potentiometer contact arm 20 along the resistance winding 21, functioning as a linear potentiometer, provides a voltage $e_1$ that is proportional to variations in the value of the distance $r$ as the aeroplane flies along its flight course AB. The voltage $e_1$ is impressed across a Selsyn rotor winding 23 that is inductively coupled with Selsyn stator windings 24 in usual manner and from which another voltage $e_2$ can be obtained. The voltage $e_2$ obtained from the Selsyn stator windings 24 is proportional to $e_1 \sin \theta$ and the voltage $e_1$ is proportional to $r$. It follows therefore that $e_2 = kr \sin \theta = ky$. In the event that the Selsyn rotor 23 is slipped 90°, so that $e_2 = kr \cos \theta$, then $e_2$ varies linearly with the distance travelled along the flight course from A to B. In this manner distance changes in the value of $r$ are applied electrically to the Selsyn rotor winding 23.

After the initial adjustment of the azimuth selector and clutch 25 and of the lane selector contact arm 32 displacements of the azimuth instrument movable hand 14, in response to the azimuth output from the receiver 10, are conducted mechanically through the azimuth selector and clutch 25 and mechanical coupling 26 directly to the Selsyn rotor 23 to mechanically alter the setting of the Selsyn rotor 23 with respect to the Selsyn stator 24 in proportion to departures in azimuth of the aeroplane from the desired flight course AB.

The azimuth selector and clutch 25, assuming that the azimuth indicating hand 14 sweeps a fixed dial in response to variations in the azimuth output from the receiver 10, may take the common form of a rotatable dial against which an adjustable hand makes strong frictional engagement. The adjustable hand is set according to the value of the angle $\theta$ when the aircraft is at position A and this setting is retained as the aircraft continues to fly along the flight course AB. The Selsyn rotor winding 23 is thereafter adjusted mechanically in its inductive coupling with the Selsyn stator windings 24 in response to the azimuth signal output from the receiver 10.

The Selsyn rotor winding 23, therefore, is adjustably positioned mechanically with respect to the Selsyn stator windings 24 in response to variations in the azimuth signal from the receiver 10 while electrically its potential $e_1$ is modified in response to variations in the distance signal from the receiver 10 by the operation of the movable distance instrument hand 13 through the mechanical coupling 15 and the distance potentiometer hand 20 contacting the resistance winding 21. The resultant alteration of the position, or the setting of the Selsyn rotor winding 23 and alteration of the potential $e_1$ applied thereto, alters the inductive coupling of the Selsyn rotor winding 23 with the Selsyn stator windings 24 of potential $e_2$.

As shown in Fig. 2 of the drawing, electrical potential from the alternating current source 22 is applied in parallel across the distance potentiometer resistance winding 21, the setting of the arm 20 of which determines the value of potential $e_1$, across an alternating current source shunting load resistor 30, that is tapped midway between its ends to provide one terminal for the potential $e_2$, and across a lane selector potentiometer resistance winding 31 that is variably tapped by the lane selector contact arm 32.

The position of the contact arm 32 upon the lane selector potentiometer resistance winding 31 determines the value of a constant potential $e_3$ that is proportional to $y$ to provide an error voltage or a potential $e_4$ for a transformer primary winding 33. The transformer primary winding 33 is connected in series with the Selsyn stator windings 24 of potential $e_2$, between the midtap on the load resistor 30 and the lane selector potentiometer contact arm 32. The lane selector potentiometer and the mid-tapped resistor 30 essentially comprise a resistive bridge network. In order to hold $y$, and hence the voltage $e_2$ to a given value, the constant voltage $e_3$, that is obtained from the resistive bridge network, is subtracted from $e_2$, and the resultant error voltage $e_4$ is used to operate a displacement indicator device, shown as a cross pointer instrument 43 for example.

The transformer primary winding 33, of the error voltage $e_4$, is inductively coupled with transformer secondary windings 34 and 35. The transformer secondary winding 34 is tapped midway between its ends to one terminal of the alternating current potential source 22 to provide two legs of a bridge. The opposite terminal of the alternating current potential source 22 is applied to a tap midway between the ends of a bridge resistor 36 that shunts the transformer secondary winding 34 to provide the other two legs of the transformer bridge. The opposite ends of the bridge resistor 36 are connected with the opposite ends of the transformer secondary winding 34 through unidirectional bridge rectifiers 40 and 41 in the same sense. Output leads from the bridge resistor 36 are shunted by a capacitor 42 and connect the ends of the bridge resistor 36 with the terminals of the cross pointer instrument 43. The instrument 43 is provided with cross pointers 44 and 45 that indicate any displacement from the flight course AB. The other transformer secondary winding 35 may be connected with automatic flight equipment in one of several known methods to operate the controls of the aeroplane for maintaining the aeroplane in automatic flight along the flight course AB.

In the application of the equipment shown in Fig. 2 to the problem of holding the flight course of the aeroplane along the elected path indicated by the line AB, the present method comprises obtaining the voltage $e_3$ proportional to $y$ and holding it constant during flight and using the linear potentiometer, comprising the movable contact arm 20 and the distance potentiometer resistance winding 21, in adjustment to provide the voltage $e_1$ proportional to the distance $r$. This voltage $e_1$ is applied to the Selsyn rotor 23 which is driven mechanically by the azimuth indicator. As previously stated the voltage $e_2$ is obtained from the Selsyn stator windings 24 and is proportional to $e_1 \sin \theta$. The voltage $e_1$ is proportional to the distance $r$ and hence $e_2 = kr \sin \theta = ky$.

Operatively, with the location of the aircraft at A known in terms of the distance AS or $r$ and of the value of the angle theta, then the value of $y$ is determined from the previously stated equation $$\sin \theta = \frac{y}{r}$$

or $y = r \sin \theta$. This value of $y$ as a potential is then applied by setting the lane selector contact arm 32 on the potentiometer resistance winding 31 and is indicated in the accompanying drawing as the constant potential $e_3$.

The procedure which the navigator or the pilot of the aircraft will use to set up the computer for flying the course between any two arbitrary points, such as along the flight course indicated by the line AB in Fig. 1, substantially will be to draw the desired course line AB on his chart, measuring its azimuth position and angle theta and measuring the perpendicular distance $y$ from the station S to the desired flight course line AB. The value of theta is then set upon the azimuth selector and clutch 25, and the lane selector potentiometer contact arm 32 is positioned upon the lane selector potentiometer resistance winding 31 in conformity with the value of $y$ as a voltage. The computer is then in condition to operate to maintain the flight course of the aircraft along the flight course line AB.

The lane selector contact arm 32 may be placed at any of a number of settings that determine the value of the potential $e_3$ proportionate to $y$ and remains so set during an operation. The value of $e_3$ and hence $y$ remains constant during an operation, whereas the values of $r$ and the angle theta vary constantly as the aircraft at A continues its flight path in the direction AB. Alterations in the distance indicating arm 13 as it is moved along the fixed dial of the distance indicating instrument 11, under the control of the distance output of the receiver 10, alters the position of the distance potentiometer arm 20 on the distance potentiometer resistance winding 21 and hence the value of the potential $e_1$ that is proportionate to the distance $r$ and that is impressed across the Selsyn rotor winding 23 in response to changes in the value of the distance $r$.

Alterations in azimuth of the aircraft as it flies along its flight path AB, or in the angle theta, as interpreted through the receiver 10 to move the azimuth indicating instrument hand 14, mechanically changes the setting of the Selsyn rotor winding 23 with respect to the Selsyn fixed windings 24 bearing the potential $e_2$. The resultant alterations in the error voltage or potential $e_4$ impressed across the transformer primary winding 33 causes the displacement of one or both of the cross pointers 44 and 45 on the cross pointer instrument 43 and indicates a displacement of the aircraft from its flight path AB that is corrected by the pilot to bring the aircraft back on course. As previously stated, the aircraft may be maintained on course AB automatically by the feeding of the error potential $e_4$ inductively into the transformer secondary winding 35 where it may be passed into one of several usual types of known aircraft control operating devices broadly identified as automatic pilots.

An important characteristic of the present computer is the inherent high stability of the flight course that is indicated thereby. No vacuum tubes are used in the computer. The accuracy of the successive positions of the aircraft along its course depends very largely upon the azimuth and the distance data that is supplied to the computer, together with the Selsyn coupling coefficient and the resistance ratios within the computer.

It is to be understood that the present disclosure is submitted for the purposes of describing and explaining a successfully operating embodiment of the present invention and that limited modifications and substitutions may be made therein without departing from the scope of the present invention.

What I claim is:

1. An aircraft flight course directing device responsive to omnidirectional beacon signals intercepted by an airborne receiver having separate distance and azimuth outputs, comprising a radio receiver, Selsyn means having a rotor at a potential responsive to the receiver distance output and responsive mechanically to the receiver azimuth output and having a stator inductively coupled with the rotor, an azimuth selector and clutch for adjustably mechanically positioning the Selsyn rotor with respect to the Selsyn stator, lane selector potentiometer means maintaining an adjustable fixed potential for application to the Selsyn stator, transformer means having a primary winding of a potential responsive to potential variations induced by the Selsyn rotor with the Selsyn stator and having a secondary winding, transformer secondary winding bridge means deriving its input inductively from the transformer primary winding and having an output, and indicator instrument means deriving its input from the bridge output and responsive to variations in the receiver distance and azimuth outputs.

2. An aircraft flight course deviation indicating device responsive to omnidirectional beacon signals intercepted by an airborne receiver having separate distance and azimuth outputs, comprising a radio receiver, Selsyn means having a movable rotor winding inductively coupled with a stator winding, distance potentiometer means converting variations in the receiver distance output into potential variations impressed across the Selsyn rotor winding, an adjustable azimuth selector and clutch mechanically actuating the Selsyn rotor in response to variations in the receiver azimuth output, adjustable lane selector resistance means maintaining a fixed potential applied to said Selsyn stator winding, transformer means having a primary winding in series with the Selsyn stator winding in the circuit of said lane selector resistance means and inductively coupled with a transformer secondary winding, transformer bridge means inclusive of the transformer secondary winding, and indicator means actuated by said transformer bridge means.

3. An electrical computer for use in conjunction with omnidirectional azimuth and distance measuring radio receiver equipment for maintaining the flight course of an aircraft parallel to a selected radial to a signal transmitting omnidirectional beacon and wherein the receiver equipment has separate distance and azimuth output circuits, comprising a radio receiver, distance responsive means actuated by the distance output from the receiver equipment and providing a distance voltage, azimuth responsive means actuated by the azimuth output from the receiver equipment, adjustable azimuth selector means mechanically operated from said azimuth responsive means, Selsyn means having a rotor winding inductively coupled with stator windings and subject to a voltage modification from the distance control and subject to mechanical modification from the azimuth selector means, transformer means having a primary winding connected in series with said Selsyn stator windings and inductively responsive to potential changes therein induced by changes in the voltage in and the disposition of the Selsyn rotor winding and having a secondary winding inductively coupled with the primary winding and part of a transformer bridge, adjustable lane selector means delivering a substantially fixed predetermined potential across the Selsyn stator winding and transformer primary winding, and presentation means receiving its input from the transformer bridge for indicating departures of the aeroplane from a preset flight course determined by the adjustment of the azimuth selector means and the lane selector means.

4. An electrical computer for use in conjunction with omnidirectional azimuth and distance measuring radio receiver equipment for maintaining the flight course of an aircraft parallel to a selected radial to a signal transmitting omnidirectional beacon wherein the receiver equipment has separate distance and azimuth output circuits, comprising a radio receiver, a distance instrument responsive to the receiver distance output, an azimuth instrument responsive to the receiver azimuth output, an adjustable azimuth selector and clutch operated by said azimuth instrument, a distance potentiometer having a potential carrying resistor winding engaged by a contact arm actuated by said distance instrument, a Selsyn having a rotor winding to which a first potential from said distance potentiometer is applied and operated mechanically from said azimuth selector and the Selsyn rotor winding inductively coupled with a Selsyn stator winding having a second potential, a lane selector potentiometer having a potential carrying resistor winding adjustably engaged by a contact arm, a load resistor connected in parallel with the resistance windings of both said distance potentiometer and said lane selector potentiometer, transformer means having a primary winding connected in series with the Selsyn stator winding between a tap midway between the ends of said load resistor and the lane selector potentiometer adjustable contact arm to carry a third potential and the transformer primary winding having a fourth error potential and the transformer means having a secondary winding inductively coupled with the primary winding and tapped midway between its ends to a first end of said load resistor and providing two legs of a transformer bridge circuit, a bridge resistor connected across the secondary winding of said transformer and tapped midway between its ends to the second end of said load resistor and providing third and fourth legs of the transformer bridge circuit, a pair of unidirectional bridge rectifiers in the same sense connecting the ends of the transformer bridge resistor with the ends of the transformer secondary winding, a capacitor shunting said bridge resistor, and indicator means having terminals connected across said capacitor.

5. Aircraft flight course maintaining receiver operated equipment responsive to signal from an omnidirectional radio beacon and providing separate receiver distance and azimuth outputs, comprising a radio receiver, a distance instrument having a movable distance indicating hand responsive to receiver distance output, an azimuth indicating instrument having a movable azimuth indicating hand responsive to receiver azimuth output, an adjustable azimuth selector means operated mechanically by said azimuth indicating hand, distance potentiometer means having a movable contact arm actuated mechanically by the distance instrument movable hand and having a resistance winding with which the contact arm makes electrical contact, a load resistor, an alternating current source applied across the distance potentiometer resistance winding connected in parallel with said load resistor, Selsyn means having a rotor winding to which is applied a potential of a magnitude determined by the position of the distance potentiometer movable contact arm upon the distance potentiometer resistance winding and the Selsyn rotor winding actuated mechanically from the azimuth selector means and the Selsyn means rotor winding being coupled inductively with Selsyn stator windings, lane selector means having a resistance winding shunting in parallel the load resistor and the alternating current source and having a movable contact arm, transformer means having a primary winding connected in series with the Selsyn stator windings between the lane selector movable hand and a tap intermediate the ends of the load resistor and inductively coupled with a transformer secondary winding tapped intermediate its ends with a first terminal of said power source to provide two legs of a transformer bridge receiving its input inductively from the transformer primary winding, a transformer bridge resistor shunting said transformer secondary winding and tapped intermediate its ends with the second terminal of said power source and providing third and fourth legs of the transformer bridge, a pair of unidirectional bridge rectifiers in the same sense connecting the ends of the bridge resistor with the ends of said transformer secondary winding, capacitor means shunting the transformer bridge resistor on the bridge output side thereof, and indicator means having terminals connected across said capacitor means and actuated upon the departure of the aircraft from a prescribed flight course established by the setting of said lane selector contact arm on said lane selector potentiometer resistance winding and of said azimuth selector means.

6. An aircraft flight course directing device responsive to signals intercepted by an airborne receiver having separate distance and azimuth outputs, comprising a radio receiver, distance indicating means responsive to ranging signal from the receiver and having a mechanical output, azimuth indicating means responsive to azimuth signal from the receiver and having a mechanical output, distance potentiometer means operated by the mechanical output of said distance indicating means, a power supply applied to said distance potentiometer means, a load resistor connected across said power supply, an adjustable lane selector potentiometer connected across said load resistor, Selsyn means having a rotor mechanically adjusted from said azimuth indicating means and electrically responsive to the potential setting of said distance potentiometer and having a stator connected between said load resistor and said lane selector potentiometer, transformer means tapping potential fluctuations in said Selsyn stator, and inductor-resistor bridge means coupled with said transformer means and providing direct current signal responsive to modifications in settings of said distance indicating means and said azimuth indicating means, and presentation means receiving its input from said bridge means.

CHESTER B. WATTS, Jr.

REFERENCES CITED

The following references are of record in the file of this patent:

UNITED STATES PATENTS

| Number | Name | Date |
|---|---|---|
| 2,382,994 | Holden | Aug. 21, 1945 |
| 2,435,195 | Bomberger et al. | Feb. 3, 1948 |
| 2,465,624 | Agins | Mar. 29, 1949 |